B. PÉDUCASSE.
BRAKE CONTROLLING DEVICE FOR BICYCLES.
APPLICATION FILED DEC. 1, 1909.
952,349.
Patented Mar. 15, 1910.
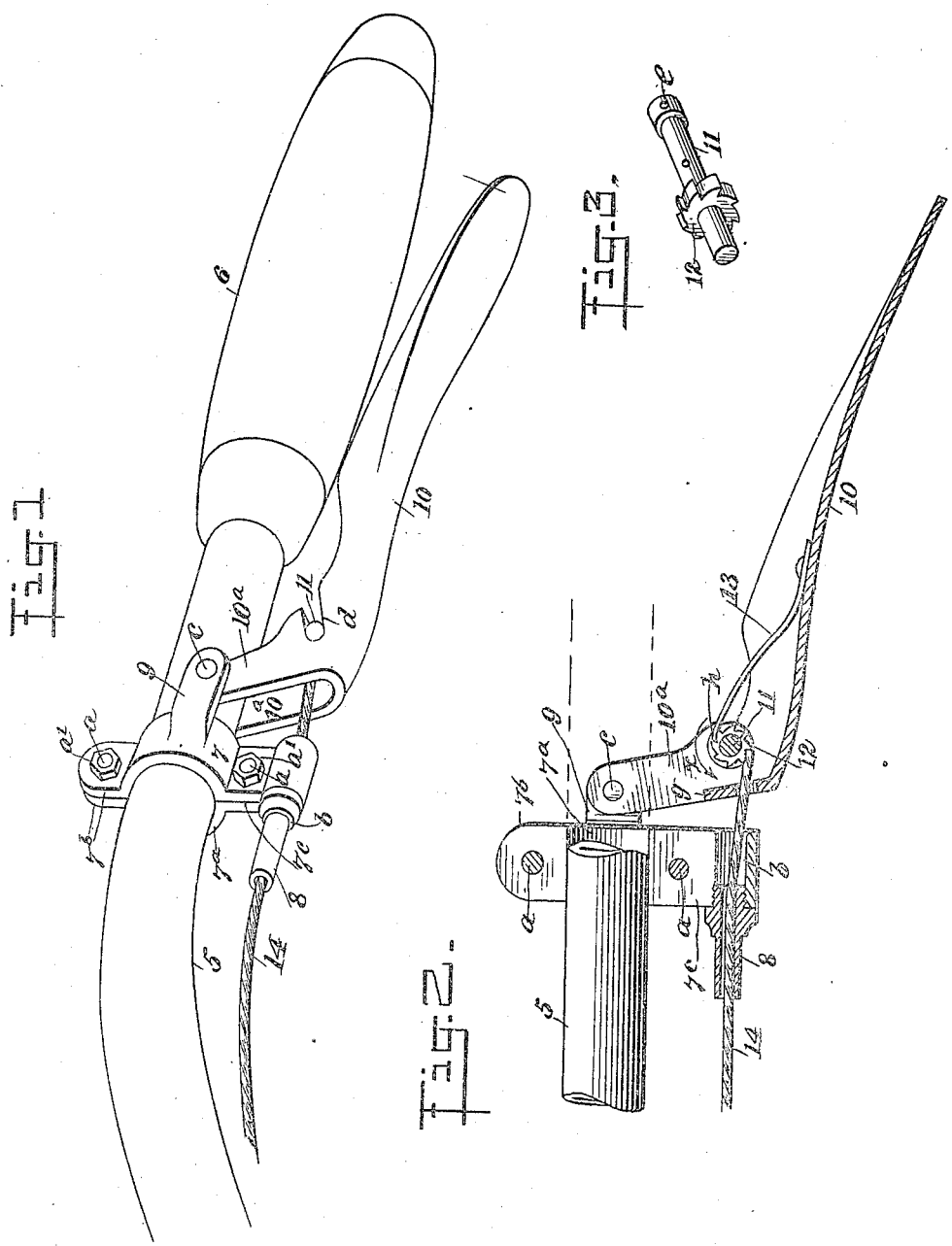
WITNESSES
INVENTOR
Bernard Péducasse
BY
ATTORNEYS

UNITED STATES PATENT OFFICE.

BERNARD PÉDUCASSE, OF LYON, FRANCE.

BRAKE-CONTROLLING DEVICE FOR BICYCLES.

952,349.    Specification of Letters Patent.    Patented Mar. 15, 1910.

Application filed December 1, 1909. Serial No. 530,812.

*To all whom it may concern:*

Be it known that I, BERNARD PÉDUCASSE, a citizen of the Republic of France, and a resident of Lyon, France, have invented a new and Improved Brake-Controlling Device for Bicycles, of which the following is a full, clear, and exact description.

This invention has for its object to provide novel features of construction for a bicycle brake controller, that enable the rider on the bicycle to produce a graduated pressure of the friction brake upon the tire of a bicycle wheel, and thus control with ease the progressive movement of the wheel when coasting down hill; and a further purpose is to so construct the controlling device, that slackness in the brake setting cable can be taken up at any time by an adjustment of parts, and thus maintain the brake in proper condition for effective operation.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a perspective view of the improvement applied upon the handle bar of a bicycle; Fig. 2 is a longitudinal sectional view of the improved controlling device; and Fig. 3 is a perspective view of a detached detail of the invention.

In the drawings, 5 indicates a portion of a handle bar of a bicycle, said bar having the usual cylindrical form, and a proper curvature to adapt it for effective service. Upon the outer end of the bar 5 an elongated grip piece 6 is secured, that affords convenient means for controlling the bicycle while in motion, it being understood that in completed form the handle bar is furnished with a duplicate of the grip piece, which is mounted upon the opposite end of the handle bar. Near the grip piece 6 a bracket arm is mounted upon the handle bar 5, said arm consisting of two half sections, each having a concavo-convex central portion, respectively designated by the characters 7 and $7^a$, and flat flanges $7^b$, $7^c$ projected oppositely from said central sections, the flanges being clamped together in pairs upon the handle bar, by bolts $a$ and nuts $a'$ that are screwed upon the ends of the bolts as shown in Fig. 1. Upon the lower ends of the depending flanges $7^c$, a semi-circular recess $b$ is formed in each, and extends transversely thereof, one of said recesses appearing in Fig. 2, the pair forming a tubulation in which one end of a guide tube 8 is secured, that projects laterally away from the grip piece 6. From each clamping section 7, $7^a$, an arm 9 is horizontally extended, said arms being disposed opposite each other. A pressure lever 10 is provided, consisting of a channeled member having sufficient length for effective service, one end of the lever body having two spaced limbs $10^a$ projecting at an angle therefrom, which are pivoted between the arms 9, as indicated at $c$, $c$, in Figs. 1 and 2. The limbs $10^a$ are reinforced by a transverse web $g$ that is formed integral therewith. A shaft 11 is journaled in two oppositely arranged openings $d$ extending inwardly from the edges of the lower portions of the limbs $10^a$, and has a diametrically enlarged hub on one end that is transversely perforated as at $e$ for the reception of a lever, wherewith the shaft may be turned. Upon the shaft 11, between its ends, a ratchet toothed wheel 12 is mounted and secured, the teeth of which are formed to be operative in the clock-wise rotation of the ratchet, as seen in Fig. 2. A detent pawl 13, preferably in the form of a flat resilient metal strip, is secured by one end upon the upper side of the pressure lever 10, and thence extends toward the periphery of the ratchet wheel 12, the free end of the pawl engaging the upper portion of said wheel between adjacent teeth thereof, as shown at $b$ in Fig. 2.

It should here be explained that the brake for the bicycle having the improvement is of a well known type, consisting of a rockable shoe, that is pressed upon the periphery of the tire on a ground wheel of the machine, by longitudinal strain applied to a cable that is connected at one end to the brake lever, not shown.

Upon the shaft 11, near the ratchet wheel 12 one end of a wire cable 14, of proper thickness, is secured and adapted for a wrapped engagement therewith. From the shaft 11 the cable 14 is extended through an opening in the web $g$ and thence through the guide tube 8 toward the brake for engagement therewith, said cable being drawn taut by turning the shaft with a lever (not shown) inserted in the transverse perforation e in said shaft. It will be seen that the trend of the cable 14 being from the lower side of the shaft 11, an upward rocking movement of the pressure lever 10 will correspondingly wrap a portion of the cable on said shaft, and by shortening it put a strain upon the actuating lever of the brake, not shown, which will cause the latter to frictionally engage the periphery of the bicycle wheel to which said brake is opposed. As the pressure lever 10 is positioned below the grip piece 6 and normally inclines from said part of the handle bar 5, it will be seen that if the rider of the bicycle grasps the lever along with the grip piece, and rocks said lever upward, the cable 14 will be drawn toward the grip piece and "set" the brake.

It will be noted that any slackness had by the cable 14, may be readily taken up and the cable rendered sufficiently taut for effective service, by turning the shaft 11 in the direction of the curved arrow x in Fig. 2, by means of a lever inserted in the perforation e as hereinbefore explained, so that the brake controlling device may be adjusted readily to render it effective.

Having thus described my invention, I claim as new and desire to secure by Letters Patent:

1. In a bicycle brake, the combination with a handle bar and a grip piece on one end thereof, of a bracket arm clamped upon the handle bar near the grip piece, spaced arms extended from the bracket arm toward the grip piece, a pressure lever having spaced limbs at one end that are lapped and pivoted on the spaced arms, a shaft rotatably mounted upon the limbs, a ratchet wheel secured on the shaft, a detent pawl on the lever, engaging teeth of the ratchet wheel, and a cable secured by one end on the shaft, said shaft being adapted for rotation to shorten the cable.

2. In a bicycle brake, the combination with a handle bar, of a bracket arm secured upon the handle bar adjacent to the grip piece thereof and provided at each side with an arm extending toward the grip piece, a pressure lever having spaced limbs extending at an angle therefrom and pivoted to the arms of the bracket arm, said limbs being provided with openings leading from the outer edges thereof inwardly, a shaft mounted in the said openings, a ratchet wheel on the shaft between the limbs of the pressure lever, a pawl on the said lever and engaging the ratchet wheel, and a cable having one end secured to the said shaft.

In testimony whereof I have signed my name to this specification in the presence of two subscribing witnesses.

BERNARD PÉDUCASSE.

Witnesses:
 THOMAS N. BROWNE,
 MARIN VACHON.